United States Patent [19]
Butcher

[11] Patent Number: 5,969,714
[45] Date of Patent: *Oct. 19, 1999

[54] INTERACTIVE VIDEO SYSTEM WITH FRAME REFERENCE NUMBER

[75] Inventor: John Anthony Weeks Butcher, Stansted, United Kingdom, .

[73] Assignee: Northern Telecom Limited, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/528,907

[22] Filed: Nov. 27, 1995

[51] Int. Cl.$^6$ ................................................. H04N 7/173
[52] U.S. Cl. ........................ 345/327; 348/7; 348/12; 455/4.2
[58] Field of Search ..................... 348/7, 12, 13, 348/6, 14, 15, 16, 17, 18, 19; 455/4.2, 5.1, 6.1; 345/327; H04N 7/16, 7/173

[56] References Cited

U.S. PATENT DOCUMENTS

| | | | |
|---|---|---|---|
| 5,371,532 | 12/1994 | Gelman et al. | 348/13 |
| 5,442,390 | 8/1995 | Hooper et al. | 348/7 |
| 5,477,263 | 12/1995 | O'Callaghan et al. | 348/7 |
| 5,481,542 | 1/1996 | Logston et al. | 348/7 |
| 5,635,979 | 6/1997 | Kostreski et al. | 348/13 |

*Primary Examiner*—Chris Grant
*Attorney, Agent, or Firm*—Lee, Mann, Smith, McWilliams, Sweeney & Ohlson

[57] ABSTRACT

In video on demand (VOD) problems may be caused by potential transmission, queuing and processing delays in the network which can lead to erratic and erroneous operation of VOD systems when responding to viewer commands. This problem is overcome by employing a video frame reference number in the return signalling channel to the video server so that the command is related to the correct frame. At the same time the viewers display is halted until the revised frame is re-received so that the display is re-enabled at the correct point in the program.

4 Claims, 1 Drawing Sheet

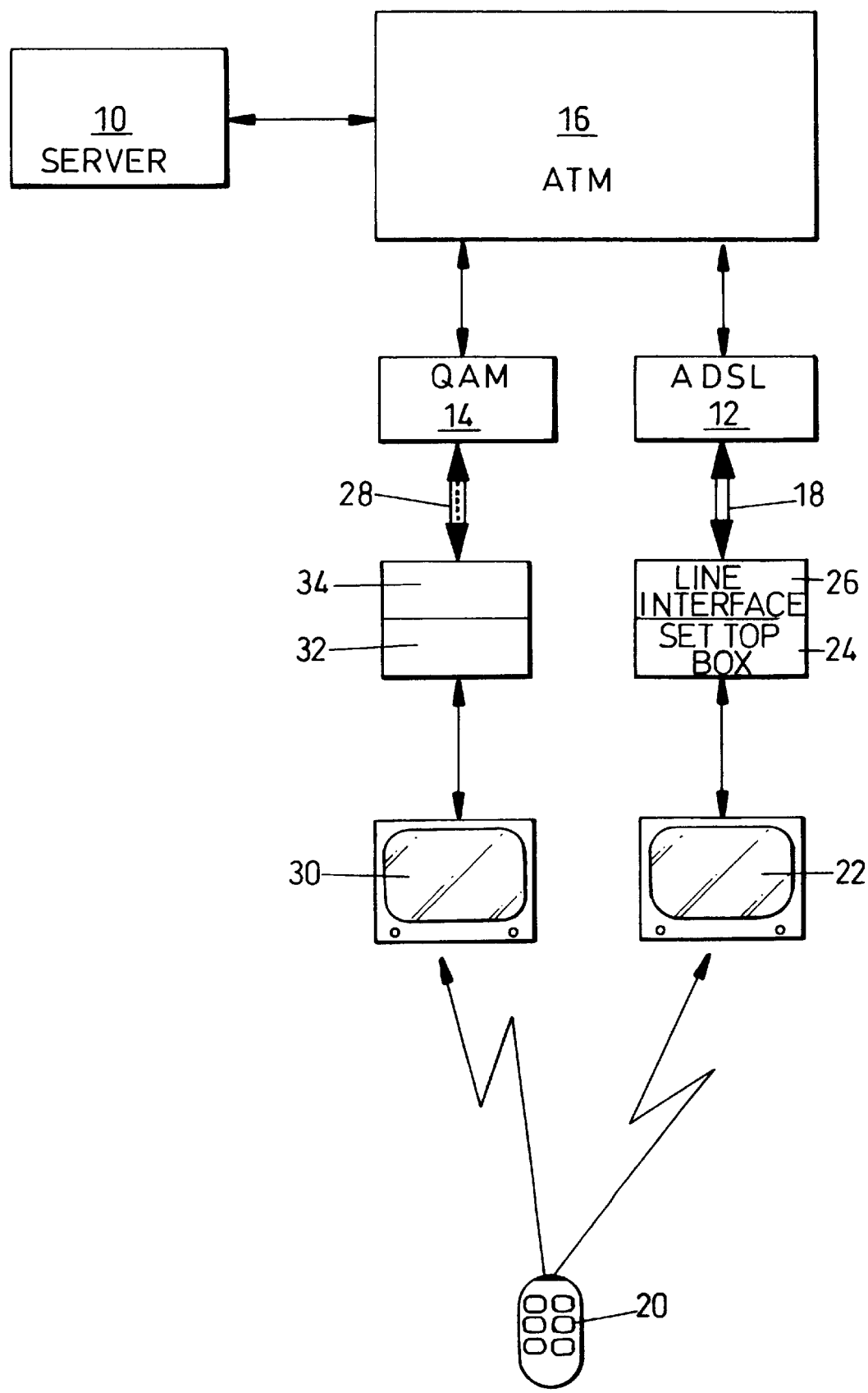

INTERACTIVE VIDEO SYSTEM WITH FRAME REFERENCE NUMBER

This invention relates an interactive video system wherein subscribers to the system can affect the operation of so-called 'video-on-demand' services.

BACKGROUND OF THE INVENTION

Interactive video systems are being developed in which a master station can be accessed by a subscriber, using either a telephone line or a return channel in a duplex fibre optic video transmission link, whereby the subscriber can in the course of transmission of video material from the master station transmit back to the master station signals which will modify subsequently transmitted video material. British patent application GB 2120507A describes a video game system in which the head end of a cable TV system transmits on request an interactive video game programme. At various times during the course of the programme the subscriber may transmit instructions back to the head end to alter the subsequent playing of the game. Further descriptions of interactive video systems are given by Deloddere et al. in IEEE Communications Magazine vol. 32 No. 5 pp 82 to 88, and by Calvert et al. in Electrical Communication No. 3 September 94 pp 281 to 289.

With the development of ever more sophisticated video games requiring greater skill and speedier reflexes on the part of the subscriber a problem can arise whereby the propagation delays in both the transmission from the head end of the video game material and the transmission back to the head end of the subscriber's instructions can lead to incorrect modification of the subsequently transmitted video game material. Take for example a game in which the subscriber 'player' is required to 'shoot' a gun at a swiftly moving target. Such an action can require split-second timing. If the transmission propagation times are comparatively long the player's 'shoot' instruction will be received at the head end some time after the target has effectively moved out of the 'line-of-fire'. Of course, if for a particular subscriber the round trip propagation time is known then a pre-calculated adjustment factor can be built into the system. However, with modern cable TV systems a single head end can serve a large subscriber area with differing propagation times for all the subscribers.

SUMMARY OF THE INVENTION

According to the present invention there is provided an interactive video system wherein a master station (head end) transmits over a network video material to a subscriber equipments, the system having means whereby individual subscriber equipments can transmit back to the master station command signals to control and modify subsequent real time transmission of the video material, in which the transmitted video material incorporates video frame reference data, characterised in that the subscriber equipments include command transmission means for transmitting with a command signals frame reference data identifying the video frame to be associated with the command signals, the master station having means responsive to the receipt of the command signal to revert to the referenced frame and recommence transmission of the video material from that frame, said retransmission being modified as required by the command signal.

In a preferred embodiment of the invention the subscriber equipments include means for pausing the display of received video material at the referenced frame associated with the command signal and recommencing display of the video material on reception of the retransmitted material.

SUMMARY OF THE INVENTION

An embodiment of the invention will now be described with reference to the accompanying drawing which is a block diagram showing the principal elements of typical video-on-demand (VOD) network configurations.

DESCRIPTION OF PREFERRED EMBODIMENT

Referring to the drawing, the diagram shows a head end video server 10 serving both asymmetrical digital subscriber line (ADSL) 12 and quadrature amplitude modulation (QAM) 14 broadband access module (BAM) arrangements via an asynchronous transfer mode (ATM) cell 16.

In the case of the ADSL BAM, distribution to individual viewer's (customer) premises is via individual conventional telephone pairs 18 which may have POTS (Plain Ordinary Telephone Service) telephony imposed on it. Upstream control signalling from the viewer's remote control unit 20 via the TV set 22, set top box 24 and line interface 26 is a discrete low speed (possibly ATM based) signalling channel which, via processing in the BAM is used for VOD channel selection and VOD channel control. In an analogous manner, the QAM broadcast access module is coupled to a customer's TV set 30 via a coaxial link 28, a line interface 34 and a set top box 32.

The main problem to be solved with respect to control signalling is the provision of an arrangement whereby from the remote control unit adjacent to viewer's terminal equipment it is possible to satisfactorily control the video server in much the same way as one would control a locally sited VCR, i.e. pause, search forward and back, high speed forward and back, etc. during the playback of a video. Where the video server also provides a distance learning capability, the remote control must be able to control and direct the course of study down selectable optional routes so that various topics may be explored in greater (or less) depth or repeated as may be desired by the viewer. Similarly, where the video server provides a distance game playing capability, the remote control must be able to control and direct the course and hence the outcome of the game with the maximum of smooth action.

The point of the problem on the control signalling requirement is that there is a finite transmission delay time for video signals from the server to the viewer and, in the reverse direction, for control signalling to the server from the viewer. These transmission delays arise (not so much) from the physical distances over which video and control signals have to flow (but due to ATM) and, possibly principally, from processing, e.g. ATM, and possibly queuing if the network becomes congested or there is signalling congestion/contention at a subscriber premises because more than a single video terminal set is being serviced. In the case of the QAM BAM approach, further delay is introduced by any multiplexing operations in the hybrid fibre/coax distribution chain and the requirement for a TDMA non-collision protocol to handle the upstream signalling.

The effect of this delay is that by the time the viewer's control (switch) signal reaches the video server, the server will be transmitting later (in time) video frames to the viewer, some of which may well still be in transit to the viewer while others, those transmitted immediately after the viewer entered his command will probably have arrived and have been displayed.

The viewer's command refers to the video frames he was viewing at the time of his command initiation. However, the viewer's command signal will have arrived somewhat later at the server where, unless precautions are taken, the command will control the server operation with respect to the current (i.e. later) video frames being transmitted. This, of course, can have disturbing and even disastrous effects as far as the viewer is concerned. At the very least the viewer is likely to sense "inertia" or non-responsiveness in the system whereby a sequence of video frames does not immediately pause, rewind, etc. This is referred to as "latency'. At worst, in a distance learning environment, an available optional route choice may be lost because the currently transmitted video frames from the server may have passed on past the option presentation point because a time-out has expired.

If, however, the interactive distance learning scheme is based solely upon the elementary concepts of Compact Disc Interactive (CD-I) operation as currently available, then the interactive distance learning scheme may not suffer from the problem indicated above since displays are staticised when options are presented to the viewer. Nevertheless to limit interactive distance learning schemes in this manner is inhibiting to the development of their full potential and therefore such an approach is not to be recommended. Further, an interactive distance learning scheme based upon the current CD-I approach to cursor control, etc. would possibly add further terminal electronics into the viewer's terminal equipment since it could prove impractical due to signalling loading to control the cursor movement via the upstream signalling channel and thereby right back at the distance learning source associated with the server. This whole area of interactive distance learning requires further investigation; it is a topic that is still in the gestation stage and should be allowed to develop to some degree of maturity rather than being constrained unduly by pre-conceived overall VOD systems aspects.

The invention provides a twofold solution to the above problems.

First, the viewer's upstream command signalling is to contain the video frame reference number relevant to the instant the command signal was initiated. It is a simple matter to insert this information into a signalling message.

Second, where the viewer's upstream command signal requires the video sequence being displayed to change in relative time, e.g. pause, forward, reverse, etc. or change topic, the frame being displayed on the viewer's TV set is staticised until, as a result of the command being exercised by the video server, a new sequence of video frames begins to be received at the viewer's terminal.

By using a video frame reference number, the head end server is able to backtrack to the video frame at which the viewer initiated his command and then act on the command from that point. Thus precision is given to the point in the video sequence to which the command refers.

Staticising the viewer's video display by local action at the viewer's terminal prevents the video sequence proceeding forwards then suddenly reverting to the frame at which the command was initiated and from which the command will be seen to be exercised. Staticising is seen as being preferred to blanking; it suggests something is about to happen—blanking suggests to the user that the whole system may have failed!

To provide video frame reference numbers, it is necessary that the individual video frames being delivered to viewer's terminals contain sequentially numbered frames. Employing sequentially numbered video frames in the analogue environment for video editing purposes is commonplace today. The Motion Picture Experts Group (MPEG) encoded video frames are also sequentially numbered as a check on the coding, transmission and decoding processes. Further, these frame sequence numbers are available for use external to the MPEG Chipset (and have to remain so in the future for this solution to work); the sequence numbers are provided by combination of the SRC (System Reference Clock) and PTS (Presentation Time Stamps) within the MPEG bit stream. Thus, the video frame reference numbering described herein applies to MPEG 1, MPEG 11 and MHEG video enconding systems.

Further, the video frame reference numbering described herein also applies to any video encoding or transmission system where the individual video frames contain sequence numbering or timing references that can be accessed both at the video storage source, for example, a video server and at the subscriber's or viewer's terminal equipment.

The other requirement is the ability to staticise the video frame on the viewer's terminal. This implies the provision of a frame store within the set top box. This is already provided since the MPEG video signals have to be decoded and presented to a conventional TV set.

While this invention has been described on the assumption that digital video encoding will be used, this is not mandatory for the system to work. Reference has already been made to the provision of frame numbering for editing analogue video pictures. In principle, this video frame numbering of analogue video frames allows the system described herein to be used in conjunction with analogue video transmission systems.

I claim:

1. An interactive video system wherein a master station (head end) transmits over a network video material comprising video frames to subscriber equipments so as to permit participation of a subscriber in a video game running at the master station, the system having means whereby an individual subscriber participating in a said video game can transmit back to the master station command signals each uniquely associated with a respective said video frame of the video game so as to control and determine subsequent real time transmission of the video material to said individual subscriber, the content of such command signals being determined solely by the interaction ofthe subscriber with the video game and being incapable of modification by the subscriber, wherein the transmitted video material incorporates frame reference data comprising frame reference numbers one for each said frame, and wherein the subscriber equipments each include command transmission means responsive to the user participation for transmitting to the master station said command signals each identiyfing that frame with which that command signal is associated uniquely by its frame reference number, the master station having means responsive to the receipt of one of command signals from a subscriber for temporarily pausing transmission of further video frames to that subscriber so as to revert to the respective referenced video frame to which that command signal corresponds and for recommencing transmission of video material subsequent to that referenced frame to the subscriber, the recommended transmission of the video material subsequent to that referenced frame being of a video frame sequence that is selected at the head end from a number of possible video sequences in response to the content of the command signal.

2. A system as claimed in claim 1, wherein the subscriber equipment includes means for staticising a video display during the period between transmission of the frame reference data and reception of the recommended transmission.

3. A method of operating an interactive video system wherein a master station (head end) transmits over a network video material comprising video frames to subscriber equipments so as to permit participation of a subscriber in a video game running at the master station, the system having means whereby an individual subscriber participating in a said video game can transmit back to the master station command signals each uniquely associated with a respective said video frame of the video game so as to control and determine subsequent real time transmission of the video material to said individual subscriber, the content of such command signals being determined solely by the interaction of the subscriber with the video game and being incapable of modification by the subscriber, the method including incorporating frame reference data comprising frame reference numbers one for each said frame in the transmitted video material, transmitting from the subscriber equipment to the master station said command signals each uniquely identifying that frame with which it is associated by its respective frame reference number, and, responsive to the receipt at the master station of each command signal incorporating the corresponding frame reference number, temporarily pausing transmission of further video frames to the subscriber so as to revert to the respective referenced video frame and recommencing transmission of video material subsequent to that referenced frame to the subscriber, the recommended transmission of the video material subsequent to that referenced frame being of a video frame sequence that is selected at the head end from a number of possible video sequences in response to the content of the command signal.

4. A method of operating an interactive video system wherein a master station (head end) transmits over a network video material comprising video frames to subscriber equipments so as to permit participation of a subscriber in a video game running at the master station, the system having means whereby an individual subscriber participating in a said video game can transmit back to the master station command signals each resulting from that subscriber's interaction with the video game and each uniquely associated with a respective said video frame of the video game so as to control and modify subsequent real time transmission of the video material to said individual subscriber, the content of such command signals being determined solely by the interaction of the subscriber with the video game and being incapable of modification by the subscriber, the method including incorporating frame reference data comprising frame reference numbers one for each said frame in the transmitted video material, transmitting from the subscriber equipment to the master station said command signals each uniquely identifying that frame with which it is associated by its respective frame reference number, and, responsive to the receipt at the master station of each command signal incorporating the corresponding frame reference number, temporarily pausing transmission of further video frames to the subscriber so as to revert to the respective referenced video frame, effecting a decision resultant on that command as to which of a number of wholly different video sequences to transmit to the subscriber, and recommencing transmission of video material from that referenced frame to the subscriber, the recommenced transmission of the video material subsequent to that referenced frame being of a video frame sequence that is selected at the head end from a number of possible video sequences in response to the content of the command signal.

* * * * *

UNITED STATES PATENT AND TRADEMARK OFFICE
CERTIFICATE OF CORRECTION

PATENT NO. : 5,969,714
DATED : Oct. 19, 1999
INVENTOR(S) : John Anthony Weeks Butcher It is certified that error appears in the above-identified patent and that said Letters Patent is hereby corrected as shown below:

On title page, item [22], should read --Sept. 15, 1995--

Signed and Sealed this

Twenty-second Day of May, 2001

Attest:

NICHOLAS P. GODICI

*Attesting Officer*     *Acting Director of the United States Patent and Trademark Office*